Aug. 14, 1934.   W. D. DRYSDALE   1,970,034
MECHANICAL MOVEMENT
Filed Aug. 4, 1932   3 Sheets-Sheet 2
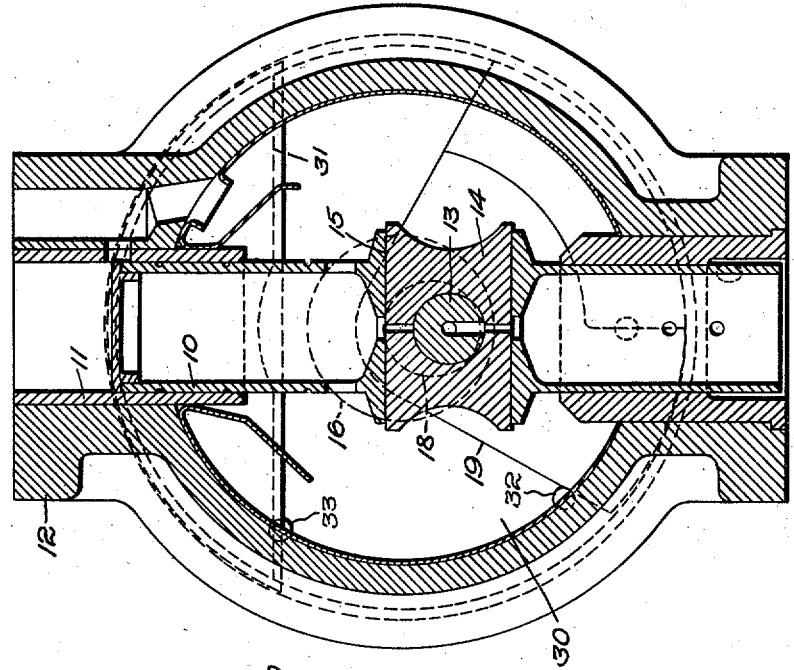
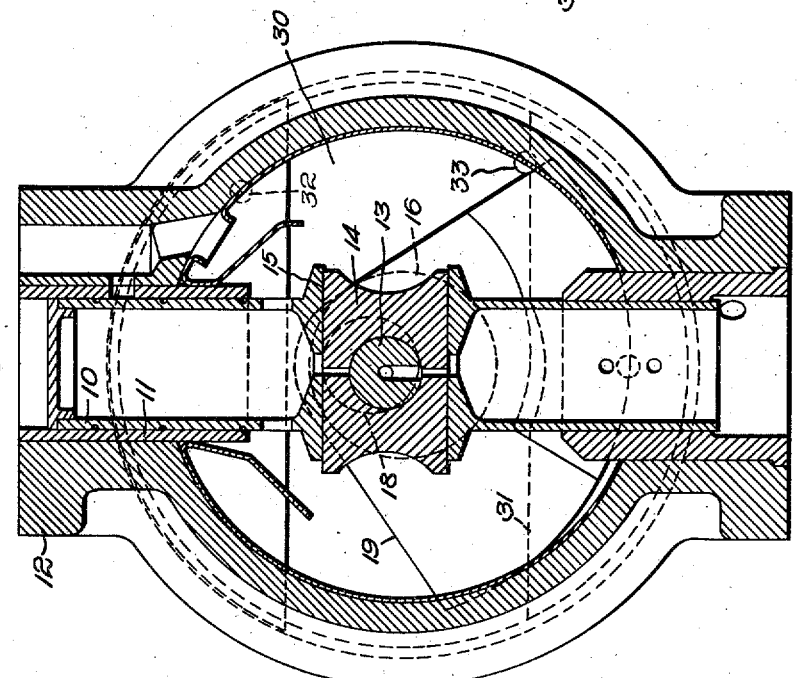
Inventor:
William D. Drysdale,
by Emery, Booth, Varney & Townsend.
Attys Aug. 14, 1934.  W. D. DRYSDALE  1,970,034
MECHANICAL MOVEMENT
Filed Aug. 4, 1932  3 Sheets-Sheet 3
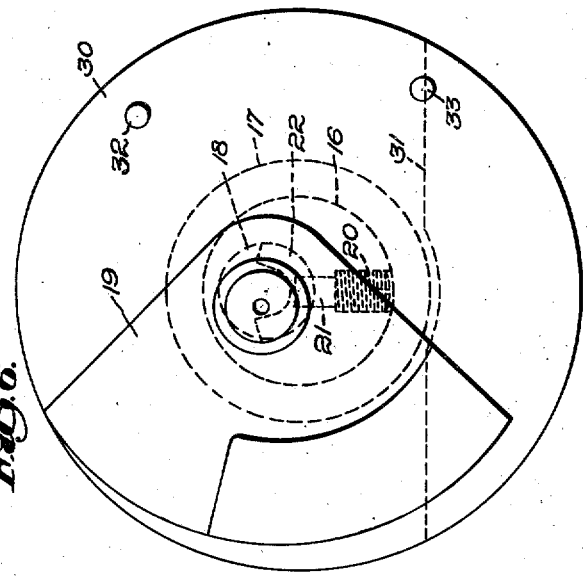
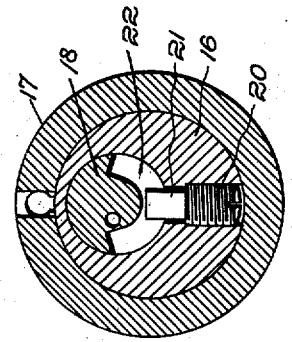
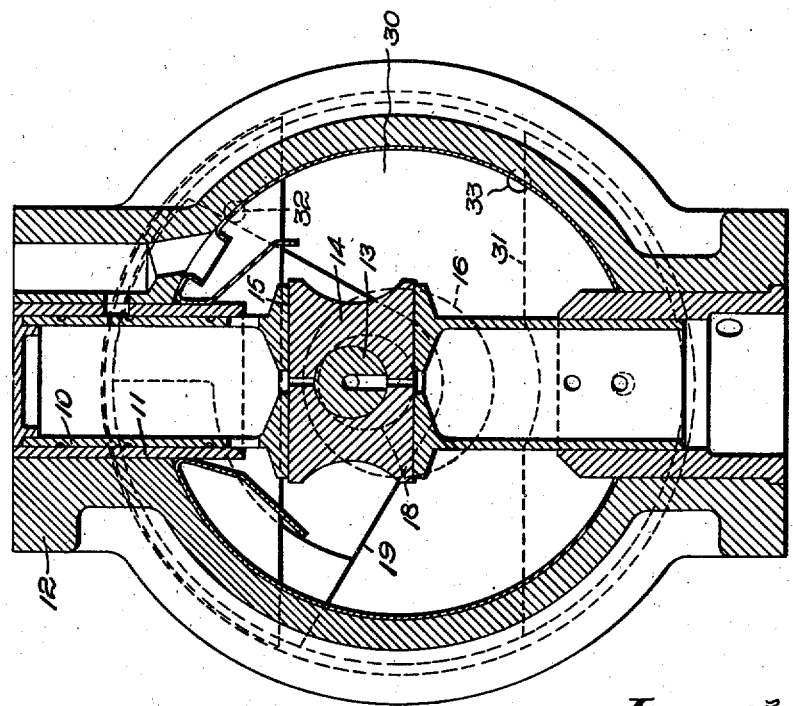
Inventor:
William D. Drysdale,
by Emery, Booth, Varney & Townsend.
Attys Patented Aug. 14, 1934

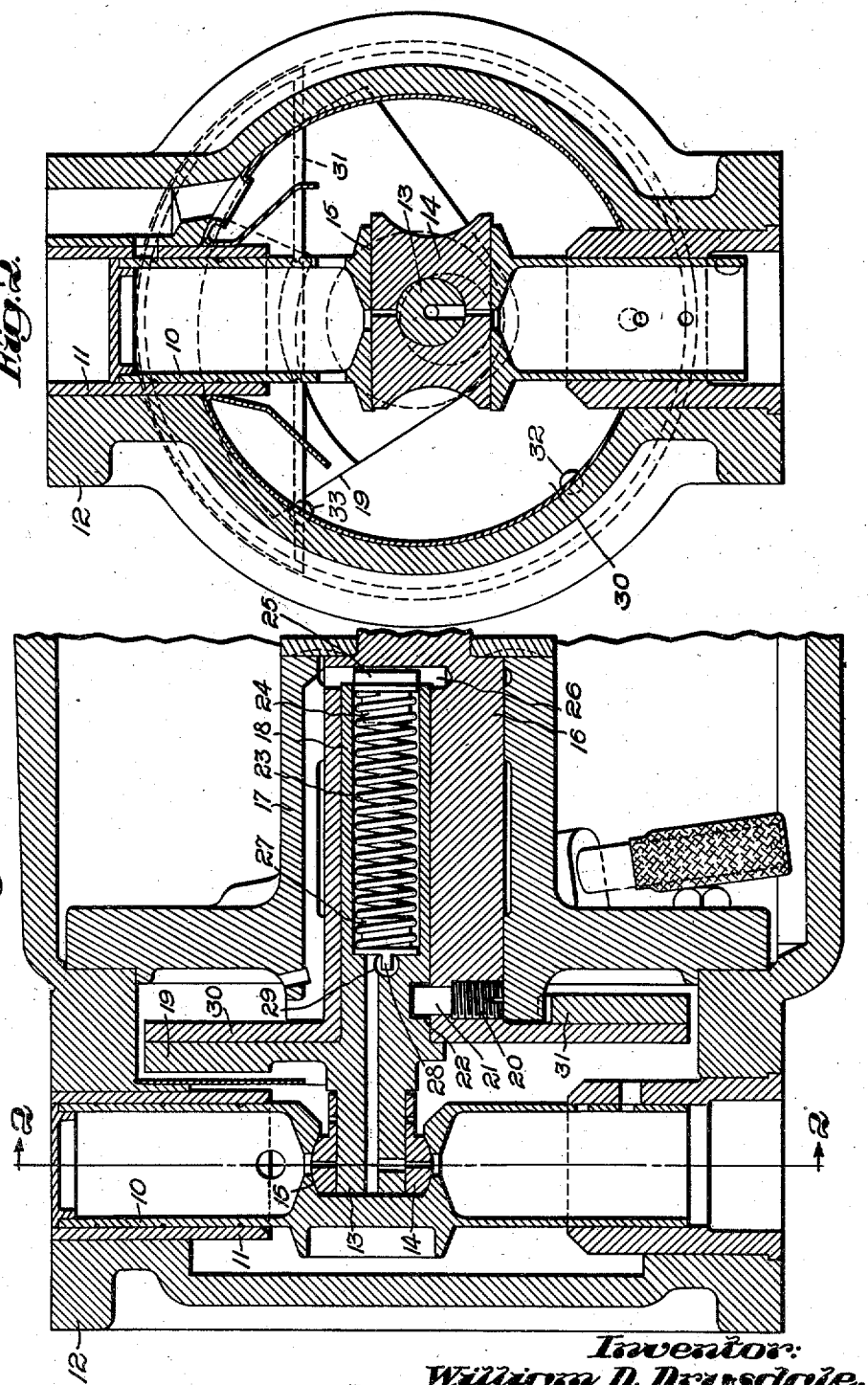

1,970,034

UNITED STATES PATENT OFFICE 1,970,034

MECHANICAL MOVEMENT

William D. Drysdale, Buffalo, N. Y., assignor to Walter J. Sugden, Boston, Mass.

Application August 4, 1932, Serial No. 627,415

20 Claims. (Cl. 74—38)

This invention relates to mechanical movements, and is concerned with a novel and improved mechanism for translating rotary motion to reciprocatory motion by the use of an orbitally movable element, such as a crank-pin, whose radius is variable automatically in response to variations in the speed of rotation of the rotatable driving element.

The invention will best be understood by reference to the following description, when taken in connection with the accompanying drawings of one specific embodiment thereof, while its scope will be pointed out more particularly in the appended claims.

In the drawings:—

Fig. 1 is a central, longitudinal section of a motion translating mechanism embodying the invention;

Figs. 2 to 5, inclusive, are sectional views on line 2—2 of Fig. 1, illustrating the operation of the mechanism;

Fig. 6 is an end elevation of a portion of the mechanism, illustrating the centrifugal weight; and Fig. 7 is a sectional view, illustrating the means for predetermining the limits of movement of the oscillatory element of the mechanism.

Referring to the drawings, and to the embodiment of the invention illustrated therein, and having reference at first more particularly to Fig. 1, there is shown a motion translating mechanism comprising a reciprocatory element 10, longitudinally slidable in a guide 11, which is supported by an appropriate support 12. A reciprocatory motion is imparted to the element 10 by an orbitally movable element, herein a crank-pin 13, suitably connected to the reciprocatory element as by a sliding shoe or cross-head 14, mounted to slide in a groove 15 extending transversely of the reciprocatory element 10, though the invention is not limited to this form of driving connection, but might employ a connecting rod or pitman.

The crank-pin is driven by a rotatable element, herein a shaft 16, mounted to rotate in a bearing 17, suitably secured to the support 12. The crank-pin is connected to the shaft by mechanism now to be described, which causes the crank-pin to impart to the reciprocating element a reciprocatory motion of variable amplitude. To this end, the crank-pin is carried by an oscillatory element, herein a rockshaft 18, having an axis of oscillation eccentric to the axis of rotation of the shaft 16. When, therefore, the rockshaft 18 is turned about its axis, the radius of the orbit of the crank-pin is varied by an amount depending upon the location of the axis of the rockshaft and the amplitude of its turning movement about such axis.

As herein shown, the eccentricity of the rockshaft and the corresponding eccentricity of the crank-pin are governed by a governor which is responsive to variations in the speed of the driving shaft 16. This is conveniently accomplished by mounting on the rockshaft a centrifugal weight 19 (best shown in Fig. 6), herein formed as an integral part of the rockshaft. Endwise movement of the rockshaft is prevented by suitable means, such as a stop screw 20 (see Fig. 7), having a reduced portion 21, which is received in a segmental groove 22 in the rockshaft 18. The screw and slot, while employed primarily to prevent endwise movement of the rockshaft, may also serve as one means to limit turning movement of the rockshaft. However, as they are near the axis, I prefer to employ other steps presently to be described, much farther from the axis, to limit turning movement of the rockshaft.

While the weight 19 might be relied upon without other aid to control the turning of the rockshaft under the influence of the variations in the speed of the driving shaft, I prefer to employ a spring 23 (see Fig. 1) to assist the weight. This spring can be arranged to present a yielding resistance to the weight 19 in either direction,— that is to say, it may be utilized either to increase or to decrease the eccentricity of the crank-pin, but in the embodiment shown, the spring is arranged to have a neutral position, in which it is not stressed, and in which the position of the stop screw 20 is in the center of the segmental slot 22 when the mechanism is at rest. This is simply a matter of securing the ends of the spring in the desired relationship of the parts which they connect. As shown in Fig. 1, one end of the spring is wound about and is secured to a plug 24, having a tongue 25, which is received in a slot 26 in the shaft 16, and the other end of the spring is wound about and is secured to a similar plug 27, having a tongue 28 received in a slot 29 in the rockshaft 18. As herein shown, the slots are conveniently formed by making drilled holes, into which the tongues extend laterally.

In order that the rotating parts shall be in balance after the full speed of the driving shaft is attained, I provide the latter with a fly-wheel 30, having a weight 31 which is opposite to the weight 19 when the latter is fully advanced,— that is to say, in its extreme outward position under the influence of centrifugal force when the driving shaft has reached a certain speed. The counter-weight 31 balances the weight 19, as well as the rockshaft with its crank-pin. This ensures smooth running, without noticeable vibration, as the two weights under this condition constitute together a balanced fly-wheel. The fly-wheel is provided with stops 32 and 33, to limit turning movement of the rockshaft in opposite directions.

The operation of the mechanism will readily be understood from a comparison of Figs. 2 to 7, inclusive. Fig. 2 shows what may be termed the retarded position, in which the radius of the crank-pin is at minimum, and the stroke of the reciprocatory element is correspondingly at minimum. The throw of the crank-pin may start from zero, or from any desired minimum point. In the form shown, the radius of the crank-pin is short, and this gives the eccentric weight a great leverage in throwing the crank-pin to its maximum throw, and to maintain it at such throw when the driving shaft is at full speed. In this position, the main shaft, rockshaft and crank-pin centers are almost directly over each other in the order named. This provides a positive drive.

The amplitude of the reciprocatory motion of the element 10 is shown by a comparison of Figs. 2 and 3, Fig. 2 showing the element 10 at the inner end or bottom of its minimum stroke, and Fig. 3 showing the outer end or top of the minimum stroke. As the speed of the driving shaft increases, the eccentricity of the crank-pin increases, until in the full running position shown in Figs. 4 and 5, the reciprocatory element 10 has its maximum stroke, Fig. 4 showing the same at the inner end of its maximum stroke, and Fig. 5 showing the same at the outer end of its maximum stroke.

It might be supposed that it would be more desirable to have the setting of the spring 23 such that the latter would tend to retain the crank-pin in its fully retarded position,—that is, the position in which the crank-pin has its shortest throw. Such setting of the spring has been found to produce satisfactory results, but it has been found more desirable to set the spring so that it tends to restore the crank-pin to its mid-position. With the latter setting of the spring, the crank-pin is at mean position when the mechanism is at rest.

When the driving shaft starts to turn, the weight 19 will by its inertia lag behind the shaft 16, and will thus bring the crank-pin momentarily to its minimum throw in opposition to the resistance of the spring. When, however, the shaft acquires sufficient speed, the centrifugal effect of the weight, due to its eccentric mounting, results in the weight being thrown outwardly with relation to the shaft. During the first half of this movement, the spring, which is under stress, assists the weight in moving outwardly with relation to the shaft.

As the speed of the shaft increases, the weight carries the rockshaft and the crank-pin past the neutral position of the spring, and thereafter the spring is stressed in the opposite direction, and yieldingly resists outward movement of the weight. When the weight, the rockshaft and the crank-pin reach their extreme outward position, the crank-pin has its greatest throw, and the reciprocatory element has its greatest stroke.

The weight would commence to lag immediately upon the cutting off of the current, if it were not for the fact that any remaining refrigerant in the cylinder acts as a brake upon the continued rotation of the rotor, which acts as a fly-wheel.

Soon after the speed of the shaft is reduced, the weight commences to lag behind the shaft, and is assisted by the spring during the first half of this backward movement with relation to the shaft. During this time, the throw of the crank-pin is reduced, and the stroke of the reciprocatory element is correspondingly decreased.

Observation of the mechanism with the setting of the spring as illustrated in the drawings shows that sometimes when the driving shaft stops, the crank-pin is returned to its position of minimum throw in opposition to the spring, while at other times, it returns only to the mid-position, in which the spring is neutral,—that is, not under stress. Observation has also shown that if the mechanism stops with the crank-pin at mid-throw, when the shaft starts again, the lag of the weight will bring the crank-pin momentarily to its minimum throw, and then as the speed of the shaft increases, the crank-pin throw will be increased to maximum as the shaft speed approaches or reaches maximum.

Having thus described one embodiment of the invention, but without limiting myself thereto, what I claim and desire by Letters Patent to secure is:

1. In a mechanism for translating rotary motion to reciprocatory motion, the combination of a rotatable driving element, an oscillatory element having a shaft portion whose axis is eccentric with relation to the axis of said rotatable element, said shaft portion being within and revolved by said rotatable element about the axis of the latter, stop means to limit oscillatory movement of said oscillatory element in opposite directions, a spring within said rotatable element yieldingly resisting oscillatory movement of said oscillatory element with relation to said rotatable element, an orbitally movable element carried by said oscillatory element and having two movements, one an orbital movement caused by rotation of said rotatable element and the other an arcuate movement caused by oscillation of said oscillatory element with relation to said rotatable element, and a weight carried by said oscillatory element to turn the latter about its axis in opposition to the yielding resistance of said spring in response to variations in the speed of rotation of said rotatable element.

2. In a mechanism for translating rotary motion to reciprocatory motion, the combination of a rotatable driving element to which power is applied, an oscillatory element having a shaft portion whose axis of oscillation is eccentric to the axis of rotation of said rotatable element, said shaft portion being within and revolved by said rotatable element about the axis of the latter, an orbitally movable element carried by said oscillatory element and having two movements, one an orbital movement caused by rotation of said rotatable element and the other an arcuate movement caused by oscillation of said oscillatory element with relation to said rotatable element, and means responsive to variations in the speed of said rotatable driving element to turn said oscillatory element about its axis.

3. In a mechanism for translating rotary motion to reciprocatory motion, the combination of a rotatable driving shaft to which power is to be applied, an oscillatory shaft whose axis is eccentric with relation to the axis of said driving shaft, said oscillatory shaft being within and revolved by said driving shaft about the axis of said driving shaft, means to limit turning of said oscillatory shaft with relation to said driving shaft, a crank-pin carried by said oscillatory shaft, and means responsive to variations in the speed of rotation of said driving shaft to turn said oscillatory shaft with relation to said driving shaft to move said crank-pin toward and from the axis of said driving shaft.

4. In a mechanism for translating rotary motion to reciprocatory motion, the combination of a rotatable driving shaft to which power is to be applied, an oscillatory shaft whose axis is eccentric with relation to the axis of said driving shaft, said oscillatory shaft being within and revolved by said driving shaft about the axis of said driving shaft, means to limit turning of said oscillatory shaft with relation to said driving shaft, a crank-pin carried by said oscillatory shaft, and speed-responsive means responsive to variations in the speed of rotation of said driving shaft to turn said oscillatory shaft with relation to said driving shaft to move said crank-pin toward and from the axis of said driving shaft.

5. In a mechanism for translating rotary motion to reciprocatory motion, the combination of a rotatable driving shaft to which power is to be applied, an oscillatory shaft whose axis is eccentric with relation to the axis of said driving shaft, said oscillatory shaft being within and revolved by said driving shaft about the axis of said driving shaft, means to limit turning of said oscillatory shaft with relation to said driving shaft, a crank-pin carried by said oscillatory shaft, and a weight carried by said oscillatory shaft responsive to variations in the rotative speed of said driving shaft to turn said oscillatory shaft with relation to said driving shaft to move said crank-pin.

6. In a mechanism for translating rotary motion to reciprocatory motion, the combination of a rotatable driving shaft, an oscillatory shaft whose axis is eccentric with relation to the axis of said driving shaft, said oscillatory shaft being within and revolved by said driving shaft about the axis of said driving shaft, means to limit turning of said oscillatory shaft with relation to said driving shaft, a crank-pin carried by said oscillatory shaft, means responsive to variations in the rotative speed of said driving shaft to turn said oscillatory shaft in one direction about its axis, and yielding means to resist such turning of said oscillatory shaft and to turn said oscillatory shaft in the opposite direction.

7. In a mechanism for translating rotary motion to reciprocatory motion, the combination of a rotatable driving shaft, an oscillatory element whose axis is eccentric with relation to the axis of said driving shaft, said oscillatory element being carried and revolved by said driving shaft about the axis of said driving shaft, means to limit turning of said oscillatory element with relation to said driving shaft, a crank-pin carried by said oscillatory element, a weight carried by said oscillatory element to turn the latter with relation to said driving shaft to move said crank-pin toward and from the axis of said shaft, and a counterweight fixedly carried by said driving shaft to balance said weight carried by said oscillatory element.

8. In a mechanism for translating rotary motion to reciprocatory motion, the combination of a rotatable driving shaft to which power is to be applied, a rockshaft whose axis is eccentric with relation to the axis of said driving shaft, said rockshaft being within and revolved by said driving shaft about the axis of the latter, a crank-pin carried by said rockshaft, and speed-responsive means responsive to variations in the speed of rotation of said driving shaft to turn said rockshaft about its axis to move said crank-pin toward and from the axis of said driving shaft.

9. In a mechanism for translating rotary motion to reciprocatory motion, the combination of a rotatable driving shaft, a bearing for said shaft, a rocking element whose axis is eccentric with relation to the axis of said shaft, said element having a part within and revolved by said shaft about the axis of the latter, a crank-pin carried by said rocking element, and a centrifugal weight carried by said element between said bearing and said crank-pin.

10. In a mechanism for translating rotary motion to reciprocatory motion, the combination of a rotatable driving shaft, a bearing for said shaft, a rocking element whose axis is eccentric with relation to the axis of said shaft, said element being carried and revolved by said shaft about the axis of the latter, a crank-pin carried by said rocking element, a centrifugal weight carried by said element between said bearing and said crank-pin, and a counterbalance weight carried by said shaft between said centrifugal weight and said shaft.

11. In a mechanism for translating rotary motion to reciprocatory motion, the combination of a rotatable driving shaft, provided with a longitudinal bore whose axis is eccentric to the axis of said shaft, a rockshaft mounted to turn in said bore, a crank-pin carried by said rockshaft and having its axis eccentric to the axis of said rockshaft, and means responsive to variations in the speed of said driving shaft to turn said rockshaft about its axis.

12. In a mechanism for translating rotary motion to reciprocatory motion, the combination of a rotatable driving shaft, provided with a longitudinal bore whose axis is eccentric to the axis of said shaft, a rockshaft mounted to turn in said bore, a crank-pin carried by said rockshaft and having its axis eccentric to the axis of said rockshaft, means responsive to variations in the speed of said driving shaft to turn said rockshaft about its axis, and a spring within said bore yieldingly resisting turning of said rockshaft in response to said means.

13. In a mechanism for translating rotary motion to reciprocatory motion, the combination of a rotatable driving shaft provided with a longitudinal bore whose axis is eccentric to the axis of said shaft, a rockshaft mounted to turn in said bore, said rockshaft also having a longitudinal bore, a crank-pin carried by said rockshaft and having its axis eccentric to the axis of said rockshaft, means responsive to variations in the speed of said driving shaft to turn said rockshaft about its axis, and a spring within the second-mentioned bore yieldingly resisting turning of said rockshaft in response to said means.

14. In a mechanism for translating rotary motion to reciprocatory motion, the combination of a rotatable driving shaft provided with a longitudinal bore whose axis is eccentric to the axis of said shaft, a rockshaft mounted to turn in said bore, means to limit turning movement of said rockshaft in said bore, a crank-pin carried by said rockshaft and having its axis eccentric to the axis of said rockshaft, and means responsive to variations in the speed of said driving shaft to turn said rockshaft about its axis.

15. In a mechanism for translating rotary motion to reciprocatory motion, the combination of a rotatable driving shaft provided with a longitudinal bore whose axis is eccentric to the axis of said shaft, a rockshaft mounted to turn in said bore, means including a stop carried by said driving shaft to limit turning movement of said rockshaft in said bore, a crank-pin carried by said rockshaft and having its axis eccentric to the axis of said rockshaft, and means responsive to variations in the speed of said driving shaft to turn said rockshaft about its axis.

16. In a mechanism for translating rotary motion to reciprocatory motion, the combination of a rotatable driving shaft provided with a longitudinal bore whose axis is eccentric to the axis of said shaft, a rockshaft mounted to turn in said bore, means to limit turning movement of said rockshaft in said bore, a crank-pin carried by said rockshaft and having its axis eccentric to the axis of said rockshaft, means responsive to variations in the speed of said driving shaft to turn said rockshaft about its axis, and a spring within said bore yieldingly resisting turning of said rockshaft in response to said means.

17. In a mechanism for translating rotary motion to reciprocatory motion, the combination of a rotatable driving shaft provided with a longitudinal bore whose axis is eccentric to the axis of said shaft, a rockshaft mounted to turn in said bore, means to limit turning movement of said rockshaft in said bore, a crank-pin carried by said rockshaft and having its axis eccentric to the axis of said rockshaft, means responsive to variations in the speed of said driving shaft to turn said rockshaft about its axis, and a torsional spring within said bore having one end secured to said rockshaft and the other end secured to said driving shaft.

18. In a mechanism for translating rotary motion to reciprocatory motion, the combination of a driving shaft to which power is to be applied, a rock-shaft whose axis is eccentric to that of said shaft, said rock-shaft being within and revolved by said driving shaft about the axis of the latter, a crank-pin carried by said rockshaft and having two movements, one an orbital movement caused by rotation of said driving shaft and the other an arcuate movement caused by rocking of said rockshaft with relation to said driving shaft, and a centrifugally operated weight carried by said rockshaft and responsive to variations in the speed of rotation of said driving shaft to rock said rock-shaft.

19. In a mechanism for transmitting power from a source of power of variable speed and torque to a reciprocatory element, the combination of a rotatable driving element to which the power is to be applied, an oscillatory element carried and revolved by said driving element about the axis of the latter, a crank-pin carried by said oscillatory element to transmit the power from said driving element to the reciprocatory element, and means responsive to variations in the speed of rotation of said driving element to turn said oscillatory element with relation to said driving element and to cause said crank-pin to move outwardly in response to increasing speed and torque of said driving element and inwardly in response to the diminishing speed and torque of said driving element, thereby to vary the stroke of the reciprocatory element in accordance with said speed and torque.

20. In a mechanism for transmitting power from a source of power of variable speed and torque to a reciprocatory element, the combination of a rotatable driving element to which the power is to be applied, an oscillatory element carried and revolved by said driving element about the axis of the latter, means to limit the oscillatory movement of said oscillatory element with relation to said driving element, a crank-pin carried by said oscillatory element to transmit the power from said driving element to the reciprocatory element, and means responsive to variations in the speed of rotation of said driving element to turn said oscillatory element with relation to said driving element and to cause said crank-pin to move outwardly in response to increasing speed and torque of said driving element and inwardly in response to diminishing speed and torque of said driving element, thereby to vary the stroke of the reciprocatory element in accordance with said speed and torque.

WILLIAM D. DRYSDALE.

CERTIFICATE OF CORRECTION.

Patent No. 1,970,034.  August 14, 1934.

WILLIAM D. DRYSDALE.

It is hereby certified that error appears in the printed specification of the above numbered patent requiring correction as follows: Page 1, line 76, for "steps" read stops; page 2, line 130, claim 2, after "is" insert to be; and that the said Letters Patent should be read with these corrections therein that the same may conform to the record of the case in the Patent Office.

Signed and sealed this 11th day of September, A. D. 1934.

Leslie Frazer
Acting Commissioner of Patents.

(Seal)

15. In a mechanism for translating rotary motion to reciprocatory motion, the combination of a rotatable driving shaft provided with a longitudinal bore whose axis is eccentric to the axis of said shaft, a rockshaft mounted to turn in said bore, means including a stop carried by said driving shaft to limit turning movement of said rockshaft in said bore, a crank-pin carried by said rockshaft and having its axis eccentric to the axis of said rockshaft, and means responsive to variations in the speed of said driving shaft to turn said rockshaft about its axis.

16. In a mechanism for translating rotary motion to reciprocatory motion, the combination of a rotatable driving shaft provided with a longitudinal bore whose axis is eccentric to the axis of said shaft, a rockshaft mounted to turn in said bore, means to limit turning movement of said rockshaft in said bore, a crank-pin carried by said rockshaft and having its axis eccentric to the axis of said rockshaft, means responsive to variations in the speed of said driving shaft to turn said rockshaft about its axis, and a spring within said bore yieldingly resisting turning of said rockshaft in response to said means.

17. In a mechanism for translating rotary motion to reciprocatory motion, the combination of a rotatable driving shaft provided with a longitudinal bore whose axis is eccentric to the axis of said shaft, a rockshaft mounted to turn in said bore, means to limit turning movement of said rockshaft in said bore, a crank-pin carried by said rockshaft and having its axis eccentric to the axis of said rockshaft, means responsive to variations in the speed of said driving shaft to turn said rockshaft about its axis, and a torsional spring within said bore having one end secured to said rockshaft and the other end secured to said driving shaft.

18. In a mechanism for translating rotary motion to reciprocatory motion, the combination of a driving shaft to which power is to be applied, a rock-shaft whose axis is eccentric to that of said shaft, said rock-shaft being within and revolved by said driving shaft about the axis of the latter, a crank-pin carried by said rockshaft and having two movements, one an orbital movement caused by rotation of said driving shaft and the other an arcuate movement caused by rocking of said rockshaft with relation to said driving shaft, and a centrifugally operated weight carried by said rockshaft and responsive to variations in the speed of rotation of said driving shaft to rock said rock-shaft.

19. In a mechanism for transmitting power from a source of power of variable speed and torque to a reciprocatory element, the combination of a rotatable driving element to which the power is to be applied, an oscillatory element carried and revolved by said driving element about the axis of the latter, a crank-pin carried by said oscillatory element to transmit the power from said driving element to the reciprocatory element, and means responsive to variations in the speed of rotation of said driving element to turn said oscillatory element with relation to said driving element and to cause said crank-pin to move outwardly in response to increasing speed and torque of said driving element and inwardly in response to the diminishing speed and torque of said driving element, thereby to vary the stroke of the reciprocatory element in accordance with said speed and torque.

20. In a mechanism for transmitting power from a source of power of variable speed and torque to a reciprocatory element, the combination of a rotatable driving element to which the power is to be applied, an oscillatory element carried and revolved by said driving element about the axis of the latter, means to limit the oscillatory movement of said oscillatory element with relation to said driving element, a crank-pin carried by said oscillatory element to transmit the power from said driving element to the reciprocatory element, and means responsive to variations in the speed of rotation of said driving element to turn said oscillatory element with relation to said driving element and to cause said crank-pin to move outwardly in response to increasing speed and torque of said driving element and inwardly in response to diminishing speed and torque of said driving element, thereby to vary the stroke of the reciprocatory element in accordance with said speed and torque.

WILLIAM D. DRYSDALE.

CERTIFICATE OF CORRECTION.

Patent No. 1,970,034.                                    August 14, 1934.

WILLIAM D. DRYSDALE.

It is hereby certified that error appears in the printed specification of the above numbered patent requiring correction as follows: Page 1, line 76, for "steps" read stops; page 2, line 130, claim 2, after "is" insert to be; and that the said Letters Patent should be read with these corrections therein that the same may conform to the record of the case in the Patent Office.

Signed and sealed this 11th day of September, A. D. 1934.

Leslie Frazer
Acting Commissioner of Patents.

(Seal)